(12) United States Patent
Lan et al.

(10) Patent No.: US 12,149,411 B2
(45) Date of Patent: Nov. 19, 2024

(54) METHOD AND SYSTEM FOR LOCATING MICRO-SERVICE FUSING ANOMALY, DEVICE AND MEDIUM

(71) Applicant: INSPUR SUZHOU INTELLIGENT TECHNOLOGY CO., LTD., Jiangsu (CN)

(72) Inventors: Yujie Lan, Jiangsu (CN); Zhengwei Liu, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 21 days.

(21) Appl. No.: 18/011,928

(22) PCT Filed: Jun. 29, 2021

(86) PCT No.: PCT/CN2021/103291
§ 371 (c)(1),
(2) Date: Dec. 21, 2022

(87) PCT Pub. No.: WO2022/042007
PCT Pub. Date: Mar. 3, 2022

(65) Prior Publication Data
US 2023/0246919 A1    Aug. 3, 2023

(30) Foreign Application Priority Data

Aug. 28, 2020   (CN) .......................... 202010885427.X (51) Int. Cl.
*H04L 41/12*       (2022.01)
*H04L 67/51*       (2022.01)

(52) U.S. Cl.
CPC .............. *H04L 41/12* (2013.01); *H04L 67/51* (2022.05)

(58) Field of Classification Search
CPC ...... G06F 16/337; G06F 16/35; G06F 21/316; G06F 11/0775; G06F 30/20; G06N 5/048; G06N 20/00
See application file for complete search history.

(56) References Cited

U.S. PATENT DOCUMENTS

| | | | |
|---|---|---|---|
| 2019/0050747 A1* | 2/2019 | Nakamura | .......... G06F 11/0775 |
| 2019/0095599 A1* | 3/2019 | Iliofotou | ............... G06F 16/337 |

(Continued)

FOREIGN PATENT DOCUMENTS

| | | | |
|---|---|---|---|
| CN | 107992398 A | 5/2018 |
| CN | 108011752 A | 5/2018 |

(Continued)

OTHER PUBLICATIONS

International search report for PCT/CN2021/103291 mailed on Aug. 10, 2021.

(Continued)

*Primary Examiner* — Mahran Y Abu Roumi
(74) *Attorney, Agent, or Firm* — Dennemeyer & Associates LLC; Victoria Friedman (57) ABSTRACT

The present disclosure discloses a method and system for locating a micro-service fusing anomaly, a device and a medium. The method includes: creating a micro-service application including a plurality of components, and determining whether a component configured with a fusing protection strategy is present in the micro-service application; in response to the presence of the component configured with the fusing protection strategy in the micro-service application, monitoring the component configured with the fusing protection strategy, and collecting data of all nodes under the component; in response to detecting the presence of a node which triggers fusing, in the component, screening out data within a preset time period; and matching a preset anomaly keyword according to the data within the preset (Continued)

time period, and associating the anomaly keyword with the node, so as to locate an anomaly.

18 Claims, 3 Drawing Sheets

(56) References Cited

U.S. PATENT DOCUMENTS

| | | | | |
|---|---|---|---|---|
| 2020/0133738 A1* | 4/2020 | Junior | ................... | G06F 9/5077 |
| 2021/0365272 A1* | 11/2021 | Mansour | ............... | G06F 9/4856 |

FOREIGN PATENT DOCUMENTS

| | | | |
|---|---|---|---|
| CN | 108240284 A | 7/2018 | |
| CN | 108600005 A | 9/2018 | |
| CN | 108712309 A | 10/2018 | |
| CN | 110351131 A | 10/2019 | |
| CN | 110888783 A | 3/2020 | |
| CN | 110908855 A | 3/2020 | |
| CN | 111130939 A | 5/2020 | |
| CN | 112187511 A | 1/2021 | |
| WO | 2018200064 A1 | 11/2018 | |

OTHER PUBLICATIONS

Search report for Chinese application 202010885427.X, filed on Aug. 28, 2020.

* cited by examiner

METHOD AND SYSTEM FOR LOCATING MICRO-SERVICE FUSING ANOMALY, DEVICE AND MEDIUM

CROSS-REFERENCE TO RELATED APPLICATIONS

This is a 35 U.S.C. 371 National Stage Patent Application of International Application No. PCT/CN2021/103291, filed Jun. 29, 2021, which claims priority to Chinese application 202010885427.X, filed Aug. 28, 2020, each of which is hereby incorporated by reference in its entirety.

TECHNICAL FIELD

The present disclosure relates to the field of cloud management platforms, and in particular, to a method and system for locating a micro-service fuse anomaly, a computer device and a readable medium.

BACKGROUND

In the cloud computing era, after a traditional application service implements micro-service cloud loading, with the continuous iterative updating of a service platform, there are more and more service components in a micro-service application system. In order to reduce maintenance costs, a non-intrusive micro service governance solution, that is, istio (a large micro-service system management tool, which provides a unified micro-service connection, security guarantee, and management and monitoring mode) is introduced, so as to implement fusing protection measures between the micro-service components, and to protect the overall availability of applications.

One micro-service application is often multi-level, and there is an independent load balance between each level. When a certain node under the component triggers fusing, a user needs to find the abnormal node from a load balance pool of one component, and locate, from mass data of the node, abnormal information when fusing is triggered, which is a time-consuming and labor-consuming thing, and which is a very difficult matter for maintaining the micro-service application.

SUMMARY

In view of this, the objective of the embodiments of the present disclosure is to provide a method and system for locating a micro-service fusing anomaly, a computer device and a computer-readable storage medium. By means of monitoring and collecting the data of all nodes under a component, when the component of a micro-service application triggers a fusing protection measure, corresponding data information and network state are quickly determined, and a corresponding keyword is matched to quickly locate an anomaly cause, thereby reducing human input and improving the operation and maintenance efficiency.

Based on the above objective, one aspect of the embodiments of the present disclosure provides a method for locating a micro-service fusing anomaly, including the following steps: creating a micro-service application including a plurality of components, and determining whether a component configured with a fusing protection strategy is present in the micro-service application; in response to the presence of the component configured with the fusing protection strategy in the micro-service application, monitoring the component configured with the fusing protection strategy, and collecting data of all nodes under the component; in response to detecting the presence of a node which triggers fusing, in the component, screening out data within a preset time period; and matching a preset anomaly keyword according to the data within the preset time period, and associating the anomaly keyword with the node, so as to locate an anomaly.

In some embodiments, the step of screening out data within the preset time period includes: determining a fusing moment, and screening out log information and operation monitoring data within a first time before and after the fusing moment.

In some embodiments, the method further includes: acquiring a network condition at the fusing moment according to the operation monitoring data, and adjusting the preset time period on the basis of the network condition.

In some embodiments, the method further includes: in response to simultaneous fusing of the plurality of components, determining whether keywords corresponding to the plurality of components are completely consistent.

In some embodiments, the method further includes: in response to the keywords corresponding to the plurality of components being completely consistent, restarting the micro-service application.

In some embodiments, the step of determining whether the component configured with the fusing protection strategy is present in the micro-service application includes: determining whether a component configured with a forwarding strategy is present in the micro-service application; and in response to the presence of the component configured with the forwarding strategy in the micro-service application, determining whether the forwarding strategy is associated with the fusing protection strategy.

In some embodiments, the step of monitoring the component, and collecting data of all nodes under the component includes: determining, according to component information of the component, all nodes corresponding to the component, and collecting log information and operation monitoring data of all nodes.

Another aspect of the embodiments of the present disclosure further provides a system for locating a micro-service fusing anomaly, including: a creation module, configured to create a micro-service application including a plurality of components, and determine whether a component configured with a fusing protection strategy is present in the micro-service application; a collection module configured to, in response to the presence of the component configured with the fusing protection strategy in the micro-service application, monitor the component configured with the fusing protection strategy, and collect data of all nodes under the component; a screening module configured to, in response to detecting the presence of a node which triggers fusing, in the component, screen out data within a preset time period; and a locating module, configured to match a preset anomaly keyword according to the data within the preset time period, and associate the anomaly keyword with the node, so as to locate an anomaly.

Yet another aspect of the embodiments of the present disclosure further provides a computer device, including: at least one processor; and a memory, wherein the memory stores a computer instruction that is executable on the processor, and when executed by the processor, the instruction implements the steps of the method as described above.

Yet another aspect of the embodiments of the present disclosure further provides a computer-readable storage medium, wherein the computer-readable storage medium stores a computer program, which implements, when executed by a processor, the steps of the method as described above.

The present disclosure has the following beneficial technical effects: by means of monitoring and collecting the data of all nodes under the component, when the component of the micro-service application triggers the fusing protection measure, corresponding data information and network state are quickly determined, and the corresponding keyword is matched to quickly locate an anomaly cause, thereby reducing human input and improving the operation and maintenance efficiency.

BRIEF DESCRIPTION OF THE DRAWINGS

To illustrate technical solutions in the embodiments of the present disclosure or in the prior art more clearly, a brief introduction on the drawings which are needed in the description of the embodiments or the prior art is given below. Apparently, the drawings in the description below are merely some of the embodiments of the present disclosure, based on which other drawings may be obtained by those ordinary skilled in the art without any creative effort.

DETAILED DESCRIPTION OF THE EMBODIMENTS

In order to make the objectives, technical solutions and advantages of the present disclosure clearer, the embodiments of the present disclosure will be further described in detail below in combination with specific embodiments and with reference to the drawings.

It should be noted that, all expressions using "first" and "second" in the embodiments of the present disclosure are to distinguish two different entities or different parameters of the same name. Therefore, "first" and "second" are only for the convenience of expression, and should not be construed as limitations to the embodiments of the present disclosure, which will not be illustrated in subsequent embodiments one by one.

Figure 1:
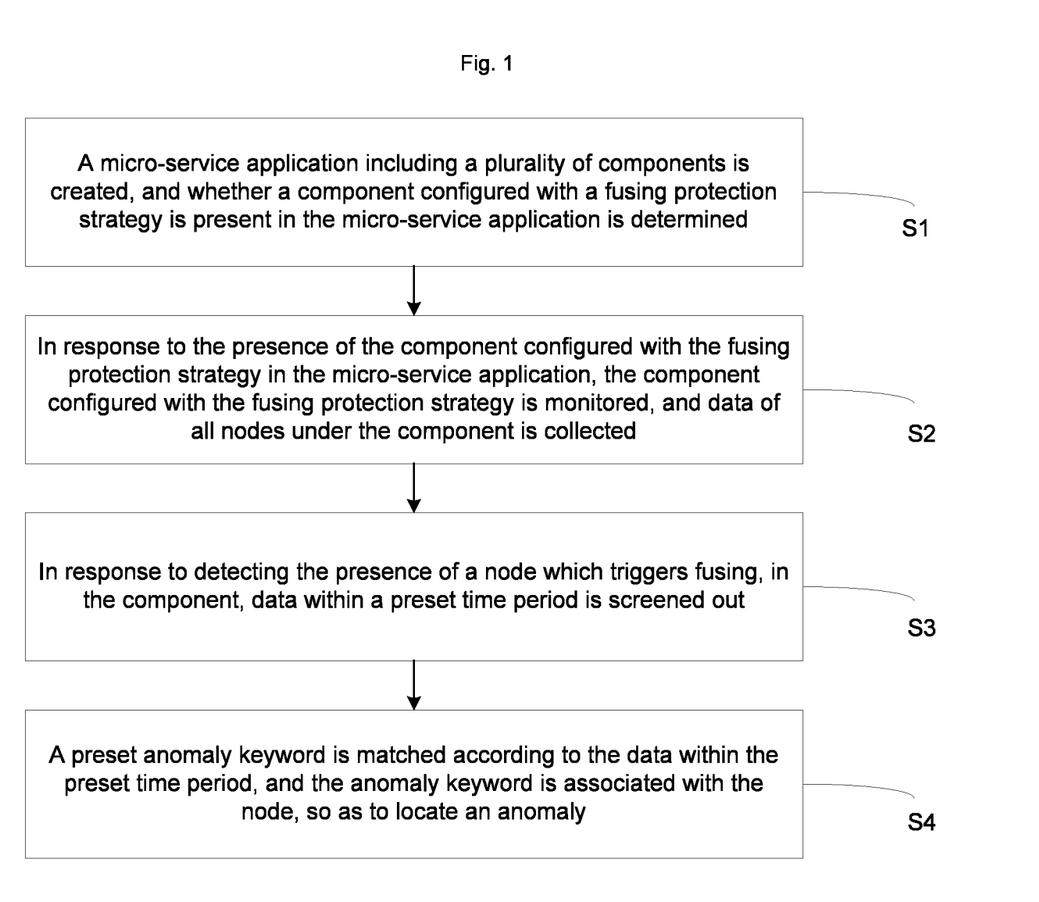
FIG. 1 is a schematic diagram of an embodiment of a method for locating a micro-service fusing anomaly provided in the present disclosure.

Based on the above objectives, a first aspect of the embodiments of the present disclosure provides an embodiment of a method for locating a micro-service fusing anomaly. FIG. 1 shows a schematic diagram of an embodiment of a method for locating a micro-service fusing anomaly provided in the present disclosure. As shown in FIG. 1, the embodiment of the present disclosure includes the following steps:

S1, creating a micro-service application including a plurality of components, and determining whether a component configured with a fusing protection strategy is present in the micro-service application;

S2, in response to the presence of the component configured with the fusing protection strategy in the micro-service application, monitoring the component configured with the fusing protection strategy, and collecting data of all nodes under the component;

S3, in response to detecting the presence of a node which triggers fusing, in the component, screening out data within a preset time period; and S4, matching a preset anomaly keyword according to the data within the preset time period, and associating the anomaly keyword with the node, so as to locate an anomaly.

A cloud management platform is a cloud computing platform based on kubernetes (K8S is an open-source container cluster management system of Google) service orchestration technology, which may provide cloud computing service management, and K8S is used for managing containerization applications on a plurality of hosts in a cloud platform. In the embodiment of the present disclosure, in a monitoring mode, when a user configures a fusing protection strategy for a component of a micro-service application, a data collection apparatus collects standard data of all nodes under the component; when a fusing monitoring apparatus detects that fusing is triggered, the standard data of a corresponding time interval is intercepted according to a preset data filtering range; according to the intercepted data and a preset anomaly keyword, an anomaly analysis apparatus marks the current fusing with a corresponding label, then a notification apparatus summarizes the collected and filtered information, and pushes abnormal point information to the user, and the user may quickly locate a problem according to these information without manually checking data information at a bottom layer.

The micro-service application including the plurality of components is created, and whether the component configured with the fusing protection strategy is present in the micro-service application is determined.

In some embodiments, the step of determining whether the component configured with the fusing protection strategy is present in the micro-service application includes: determining whether a component configured with a forwarding strategy is present in the micro-service application; and in response to the presence of the component configured with the forwarding strategy in the micro-service application, determining whether the forwarding strategy is associated with the fusing protection strategy. The user creates a micro-service application on the cloud management platform, the micro-service application includes a plurality of components, each component includes a plurality of nodes, a Destination Rule (DR, forwarding strategy) rule resource is created for the component at a kubernetes bottom layer, and after a fusing strategy is configured for a certain component, the DR records a fusing trigger rule, for example, when an error occurs in a certain node of the component for 10 consecutive times, and the error includes a 5xx type HTTP (Hyper Text Transfer Protocol, hyper text transfer protocol) response error, TCP (Transmission Control Protocol, transmission control protocol) connection timeout/failure, and user-defined program anomaly feedback, etc.

In response to the presence of the component configured with the fusing protection strategy in the micro-service application, the component is monitored, and the data of all nodes under the component is collected. When monitoring that the DR has enabled a fusing configuration, the monitoring apparatus sends a collection request to the data collection apparatus, after receiving the collection request, the data collection apparatus finds all corresponding service nodes according to the component information, and collects standard control console data of each node.

In some embodiments, the step of monitoring the component, and collecting data of all nodes under the component includes: determining, according to component information of the component, all nodes corresponding to the component, and collecting log information and operation monitoring data of all nodes.

In response to detecting the presence of the node which triggers fusing, in the component, data within the preset time period is screened out. When the component of the micro-service application is abnormal, and when fusing is triggered, the monitoring apparatus sends a data filtering request to the anomaly analysis apparatus, and the anomaly analysis apparatus screens out the data within the preset time period after receiving the data filtering request.

In some embodiments, the step of screening out data within the preset time period includes: determining a fusing moment, and screening out log information and operation monitoring data within a first time before and after the fusing moment. According to the fusing moment and node information, data information within the first time before and after the fusing moment of a corresponding fused node is filtered and screened out, and the first time may be, for example, 10 seconds.

The preset anomaly keyword is matched according to the data within the preset time period, and the anomaly keyword is associated with the node, so as to locate the anomaly. After the data information within the preset time period is acquired, abnormal information is matched from the preset anomaly keyword, and the data information is marked with a keyword label. Assuming that the preset anomaly keyword includes NullPointerException, IOException, SQLException, and the like, if a log within the preset time period contains the abnormal information of these keywords, then this segment of log will be marked with a corresponding label, and a corresponding skipping connection is performed, such that the user can conveniently click the keyword to skip to a corresponding log paragraph.

In some embodiments, the method further includes: acquiring a network condition at the fusing moment according to the operation monitoring data, and adjusting the preset time period on the basis of the network condition. The anomaly analysis apparatus further acquires the operation monitoring data of the fused node, and acquires, from the operation monitoring data, the network condition when the fusing is triggered, for example, a response time, a response state code, a time delay, a throughput and the like of the HTTP. The duration of the preset time period may also be adjusted according to the network condition.

In some embodiments, the method further includes: in response to simultaneous fusing of the plurality of components, determining whether keywords corresponding to the plurality of components are completely consistent. In some embodiments, the method further includes: in response to the keywords corresponding to the plurality of components being completely consistent, restarting the micro-service application. If the plurality of components are fused at the same time, and fusing anomalies are the same, there may be a problem in the architecture of the micro-service application, and thus the micro-service application may be restarted.

It should be particularly pointed out that, in various embodiments of the foregoing method for locating the micro-service fusing anomaly, the various steps may be exchanged, replaced, increased and decreased, therefore these reasonable permutation and combination transformations should also fall within the protection scope of the present disclosure with respect to the method for locating the micro-service fusing anomaly, and the protection scope of the present disclosure should not be limited to the embodiments.

Figure 2:
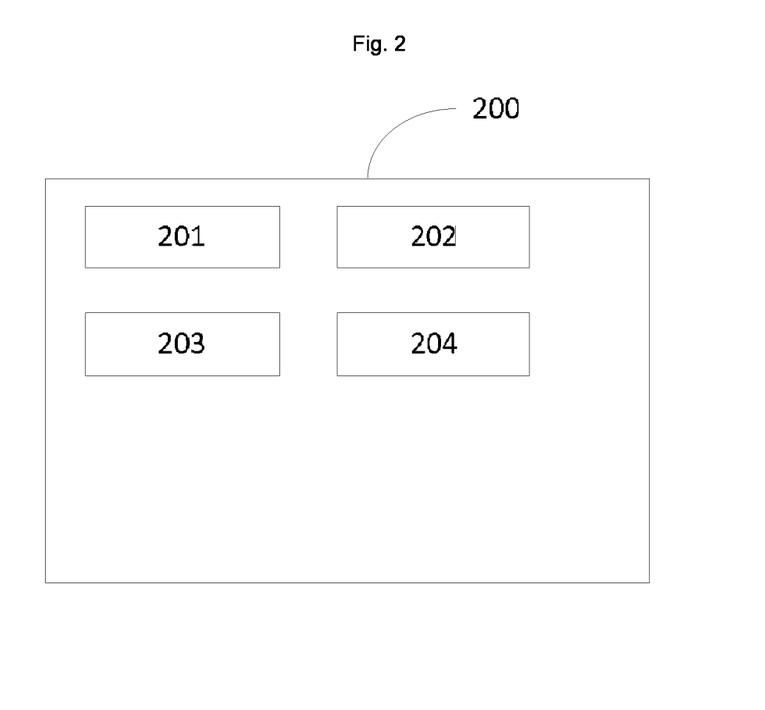
FIG. 2 is a schematic diagram of an embodiment of a system for locating a micro-service fusing anomaly provided in the present disclosure.

Based on the above objectives, a second aspect of the embodiments of the present disclosure provides a system 200 for locating a micro-service fusing anomaly. As shown in FIG. 2, the system includes: a creation module 201, configured to create a micro-service application including a plurality of components, and determine whether a component configured with a fusing protection strategy is present in the micro-service application; a collection module 202 configured to, in response to the presence of the component configured with the fusing protection strategy in the micro-service application, monitor the component configured with the fusing protection strategy, and collect data of all nodes under the component; a screening module 203 configured to, in response to detecting the presence of a node which triggers fusing, in the component, screen out data within a preset time period; and a locating module 204, configured to match a preset anomaly keyword according to the data within the preset time period, and associate the anomaly keyword with the node, so as to locate an anomaly.

In some embodiments, the screening module 203 is configured to: determine a fusing moment, and screen out log information and operation monitoring data within a first time before and after the fusing moment.

In some embodiments, the system further includes: a second collection module, configured to acquire a network condition at the fusing moment according to the operation monitoring data, and adjust the preset time period on the basis of the network condition.

In some embodiments, the system further includes: a determination module configured to, in response to simultaneous fusing of the plurality of components, determine whether keywords corresponding to the plurality of components are completely consistent.

In some embodiments, the system further includes: a restart module configured to, in response to the keywords corresponding to the plurality of components being completely consistent, restart the micro-service application.

In some embodiments, the creation module 201 is configured to: determine whether a component configured with a forwarding strategy is present in the micro-service application; and in response to the presence of the component configured with the forwarding strategy in the micro-service application, determine whether the forwarding strategy is associated with the fusing protection strategy.

In some embodiments, the collection module 202 is configured to: determine, according to component information of the component, all nodes corresponding to the component, and collect log information and operation monitoring data of all nodes.

Based on the above objective, a third aspect of the embodiments of the present disclosure provides a computer device, including: at least one processor; and a memory, wherein the memory stores a computer instruction that is executable on the processor, and when executed by the processor, the instruction implements the following steps: S1, creating a micro-service application including a plurality of components, and determining whether a component configured with a fusing protection strategy is present in the micro-service application; S2, in response to the presence of the component configured with the fusing protection strategy in the micro-service application, monitoring the component configured with the fusing protection strategy, and collecting data of all nodes under the component; S3, in response to detecting the presence of a node which triggers fusing, in the component, screening out data within a preset time period; and S4, matching a preset anomaly keyword according to the data within the preset time period, and associating the anomaly keyword with the node, so as to locate an anomaly.

In some embodiments, the step of screening out data within the preset time period includes: determining a fusing moment, and screening out log information and operation monitoring data within a first time before and after the fusing moment.

In some embodiments, the steps further include: acquiring a network condition at the fusing moment according to the operation monitoring data, and adjusting the preset time period on the basis of the network condition.

In some embodiments, the steps further include: in response to simultaneous fusing of the plurality of components, determining whether keywords corresponding to the plurality of components are completely consistent.

In some embodiments, the steps further include: in response to the keywords corresponding to the plurality of components being completely consistent, restarting the micro-service application.

In some embodiments, the step of determining whether the component configured with the fusing protection strategy is present in the micro-service application includes: determining whether a component configured with a forwarding strategy is present in the micro-service application; and in response to the presence of the component configured with the forwarding strategy in the micro-service application, determining whether the forwarding strategy is associated with the fusing protection strategy.

In some embodiments, the step of monitoring the component, and collecting data of all nodes under the component includes: determining, according to component information of the component, all nodes corresponding to the component, and collecting log information and operation monitoring data of all nodes.

Figure 3:
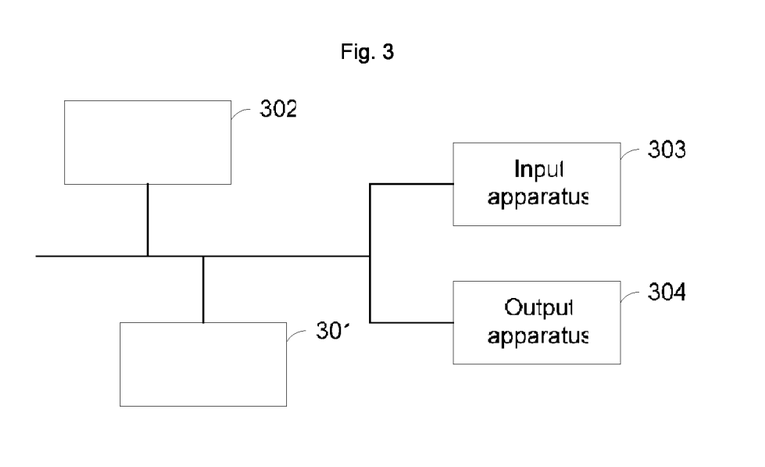
FIG. 3 is a schematic diagram of a hardware structure of an embodiment of a computer device for locating a micro-service fusing anomaly provided in the present disclosure.

As shown in FIG. 3, it is a schematic diagram of a hardware structure of an embodiment of a computer device for locating the micro-service fusing anomaly provided in the present disclosure.

With the apparatus shown in FIG. 3 as an example, the apparatus includes a processor 301 and a memory 302, and may further include an input apparatus 303 and an output apparatus 304.

The processor 301, the memory 302, the input apparatus 303 and the output apparatus 304 may be connected by a bus or in other manners, and in FIG. 3, a connection by the bus is taken as example.

As a non-volatile computer-readable storage medium, the memory 302 may be used for storing non-volatile software programs, non-volatile computer-executable programs and modules, for example, program instructions/modules corresponding to the method for locating the micro-service fusing anomaly in the embodiments of the present application. By means of running the non-volatile software programs, instructions and modules stored in the memory 302, the processor 301 executes various functional applications and data processing of a server, that is, implements the method for locating the micro-service fusing anomaly in the foregoing method embodiment.

The memory 302 may include a program storage area and a data storage area, wherein the program storage area may store application programs required by an operating system and at least one function; and the data storage area may store data created according to the use of the method for locating the micro-service fusing anomaly. In addition, the memory 302 may include high-speed random access memory, and may also include a non-volatile memory, such as at least one magnetic disk storage device, a flash memory device, or other non-volatile solid-state storage devices. In some embodiments, the memory 302 optionally includes memories that are arranged remotely relative to the processor 301, and these memories may be connected to a local module by a network. Instances of the network include, but are not limited to, the Internet, an intranet, a local area network, a mobile communication network, and combinations thereof.

The input apparatus 303 may receive information such as an input user name and password. The output apparatus 304 may include a display device such as a display screen.

One or more program instructions/modules corresponding to the method for locating the micro-service fusing anomaly are stored in the memory 302, and when executed by the processor 301, implement the method for locating the micro-service fusing anomaly in any of the foregoing method embodiments.

Any embodiment of the computer device for implementing the above method for locating the micro-service fusing anomaly may achieve the same or similar effects as any of the foregoing method embodiments corresponding thereto.

Figure 4:
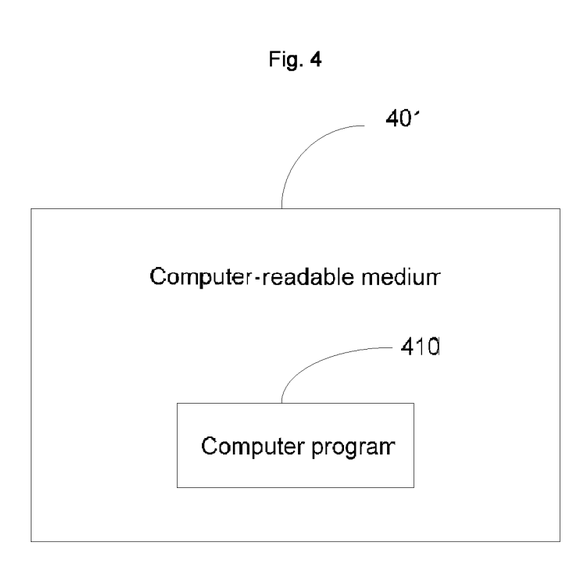
FIG. 4 is a schematic structural diagram of a computer-readable storage medium provided in an embodiment of the present disclosure.

The present disclosure further provides a computer-readable storage medium 401, wherein the computer-readable storage medium 401 stores a computer program 410, which implements, when executed by a processor, the method as described above, as shown in FIG. 4.

Finally, it should be noted that, those ordinary skilled in the art may understand that all or some processes in the embodiments of the method described above may be implemented by instructing relevant hardware by means of a computer program, and a program of the method for locating the micro-service fusing anomaly may be stored in a computer-readable storage medium, and when executed, the program may include a process of embodiments of the methods described above. The storage medium of the program may be a magnetic disk, an optical disk, a read-only storage memory (ROM), or a random storage memory (RAM), etc. The embodiments of the above computer program may achieve the same or similar effects as any of the foregoing method embodiments corresponding thereto.

The above descriptions are exemplary embodiments of the present disclosure, but it should be noted that various changes and modifications may be made without departing from the scope of the embodiments of the present disclosure defined by the claims. The functions, steps and/or actions of the method claims according to the disclosed embodiments described herein need not be performed in any particular order. In addition, although the elements disclosed in the embodiments of the present disclosure may be described or claimed in an individual form, it may be understood that there are a plurality of elements, unless explicitly limited to be singular.

It should be understood that, as used herein, a singular form "an" is intended to include a plural form as well, unless the context clearly supports exceptional cases. It should also be understood that, the term "and/or" as used herein refers to including any and all possible combinations of one or more items listed in an association manner.

The sequence numbers of the embodiments disclosed in the embodiments of the present disclosure are merely for description, and do not represent the advantages and disadvantages of the embodiments.

Those ordinary skilled in the art may understand that, all or some steps for implementing the above embodiments may be completed by hardware, and may also be completed by a program instructing related hardware, the program may be stored in a computer-readable storage medium, and the storage medium mentioned above may be a read-only memory, a magnetic disk, an optical disk, etc.

Those ordinary skilled in the art to which the present disclosure belongs should understand that, the discussion of any of the above embodiments is merely exemplary, and is not intended to imply that the scope (including the claims) disclosed in the embodiments of the present disclosure is limited to these examples; and in the idea of the embodiments of the present disclosure, the technical features in the above embodiments or different embodiments may also be combined with each other, there are many other changes in different aspects of the embodiments of the present disclosure as described above, and are not provided in detail for the sake of brevity. Therefore, any omissions, modifications, equivalent replacements, improvements, and the like, made within the spirit and principles of the embodiments of the present disclosure, shall fall within the protection scope of the embodiments of the present disclosure.

What is claimed is:

1. A method for locating a micro-service fusing anomaly, comprising the following steps:
   creating a micro-service application comprising a plurality of components, and
   determining whether a component configured with a fusing protection strategy is present in the micro-service application;
   in response to the presence of the component configured with the fusing protection strategy in the micro-service application, monitoring the component configured with the fusing protection strategy, and collecting data of all nodes under the component configured with the fusing protection strategy;
   in response to detecting the presence of a node which triggers fusing, in the component configured with the fusing protection strategy, screening out data within a preset time period; and
   matching a preset anomaly keyword according to the data within the preset time period, and associating the anomaly keyword with the node, so as to locate an anomaly;
   creating a Destination Rule resource for a component:
   recording, by the Destination Rule, a fusing trigger role, after the fusing protection strategy is configured for a certain component,
   wherein the step of in response to the presence of the component configured with the fusing protection strategy in the micro-service application, monitoring the component configured with the fusing protection strategy, and collecting data of all nodes under the component comprises,
   in response to monitoring that the Destination Rule has enabled a fusing configuration, sending by a monitoring apparatus, a collection request to a data collection apparatus;
   seeking, by the data collection apparatus, all corresponding service nodes according to component information, and collecting standard control console data of each node, after receiving the collection request.

2. The method according to claim 1, wherein the step of screening out data within the preset time period comprises: determining a fusing moment, and screening out log information and operation monitoring data within a first time before and after the fusing moment.

3. The method according to claim 2, further comprising: acquiring a network condition at the fusing moment according to the operation monitoring data, and adjusting the preset time period on the basis of the network condition.

4. The method according to claim 1, further comprising: in response to simultaneous fusing of the plurality of components, determining whether keywords corresponding to the plurality of components are completely consistent.

5. The method according to claim 4, further comprising: in response to the keywords corresponding to the plurality of components being completely consistent, restarting the micro-service application.

6. The method according to claim 1, wherein the step of determining whether the component configured with the fusing protection strategy is present in the micro-service application comprises:
   determining whether a component configured with a forwarding strategy is present in the micro-service application; and
   in response to the presence of the component configured with the forwarding strategy in the micro-service application, determining whether the forwarding strategy is associated with the fusing protection strategy.

7. The method according to claim 1, wherein the step of monitoring the component, and collecting data of all nodes under the component comprises:
   determining, according to component information of the component configured with the fusing protection strategy, all nodes corresponding to the component configured with the fusing protection strategy, and collecting log information and operation monitoring data of all nodes.

8. A computer device, comprising:
   at least one processor; and
   a memory, wherein the memory stores a computer instruction that is executable on the processor, and when executed by the processor, the instruction causes the processor to:
   create a micro-service application comprising a plurality of components, and determine whether a component configured with a fusing protection strategy is present in the micro-service application;
   in response to the presence of the component configured with the fusing protection strategy in the micro-service application, monitor the component configured with the fusing protection strategy, and collect data of all nodes under the component configured with the fusing protection strategy;
   in response to detecting the presence of a node which triggers fusing, in the component configured with the fusing protection strategy, screen out data within a preset time period; and
   match a preset anomaly keyword according to the data within the preset time period, and associating the anomaly keyword with the node, so as to locate an anomaly;
   creating a Destination Rule resource for a component;
   recording, by the Destination Rule fusing trigger rule, after the fusing protection strategy is configured for a certain component,
   wherein the step of in response to the presence of the component configured with the fusing protection strategy in the micro-service application, monitoring the component configured with the fusing protection strategy, and collecting data of all nodes under the component comprises:
in response to monitoring that the Destination Rule has enabled a fusing configuration, sending, by a monitoring apparatus, a collection request to a data collection apparatus;
seeking, by the data collection, all corresponding service nodes according to component information, and collecting standard control console data of each node, after receiving the collection request.

9. A non-transitory computer-readable storage medium, wherein the computer-readable storage medium stores a computer program, and when executed by a processor, the computer program cause the processor to:
create a micro-service application comprising a plurality of components, and determine whether a component configured with a fusing protection strategy is present in the micro-service application;
in response to the presence of the component configured with the fusing protection strategy in the micro-service application, monitor the component configured with the fusing protection strategy, and collect data of all nodes under the component configured with the fusing protection strategy;
in response to detecting the presence of a node which triggers fusing, in the component configured with the fusing protection strategy, screen out data within a preset time period; and
match a preset anomaly keyword according to the data within the preset time period, and associating the anomaly keyword with the node, so as to locate an anomaly:
creating a Destination Rule resource for a component;
recording, by the Destination Rule, a fusing trigger rule, after the fusing protection strategy is configured for a certain component,
wherein the step of in response to the presence of the component configured with the fusing protection strategy in the micro-service application, monitoring the component configured with the fusing protection strategy, and collecting data of all nodes under the component comprises:
in response to monitoring the Destination Rule has enabled using configuration, sending, by a monitoring apparatus, a collection request to a data collect apparatus:
seeking, by the data collection apparatus, all corresponding service nodes according to component information, and collecting standard control console data of each node, after receiving the collection request.

10. He method according to claim 1, wherein the micro-service application is created on a cloud management platform to provide cloud computing service management.

11. He method according to claim 10, wherein the cloud management platform is a cloud computing platform based on kubernetes service orchestration technology, and the kubernetes service orchestration technology is used for managing containerization applications on a plurality of hosts in the cloud platform.

12. He method according to claim 10, wherein the micro-service application comprises a plurality of components, each component comprises a plurality of nodes.

13. The method according to claim 11, further comprising:
creating the Destination Rule resource for a component at a kubernetes bottom layer.

14. He method according to claim 13, wherein the fusing trigger rule comprises an error occurs in a certain node of the component for preset consecutive times, the error comprises: a 5xx type Hyper Text Transfer Protocol, hyper text transfer protocol response error, Transmission Control Protocol, transmission control protocol connection timeout or failure, and user-defined program anomaly feedback.

15. He method according to claim 1, wherein the step of in response to detecting the presence of a node which triggers fusing, in the component configured with the fusing protection strategy, screening out data within a preset time period comprises:
in response to detecting the component of the micro-service application is abnormal, and fusing is triggered, sending, by the monitoring apparatus, a data filtering request to a anomaly analysis apparatus, which screens out the data within the preset time period after receiving the data filtering request.

16. The method according to claim 1, wherein the step of matching a preset anomaly keyword according to the data within the preset time period, and associating the anomaly keyword with the node, so as to locate an anomaly comprises:
after acquiring the data information within the preset time period, matching abnormal information from the preset anomaly keyword;
marking the data information with a keyword label;
response to a log within the preset time period contains the abnormal information of the preset anomaly keyword, marking the log with a corresponding label, and performing a corresponding skipping connection.

17. He method according to claim 3, wherein the network condition comprises: a response time, a response state code, a time delay, and a throughput of HTTP.

18. The method according to claim 4, further comprising:
in response to the keywords corresponding to the plurality of components being completely consistent, determining an anomaly in architecture of the micro-service application.

* * * * *